Aug. 23, 1966    T. E. BJORN    3,268,734
OIL MIST FLUID MONITOR
Filed Sept. 30, 1963    2 Sheets-Sheet 1

INVENTOR
Thomas E. Bjorn
By William J. Newman
Attorney

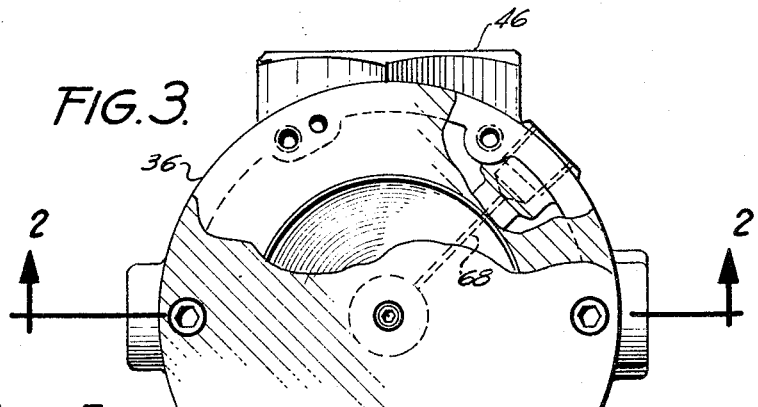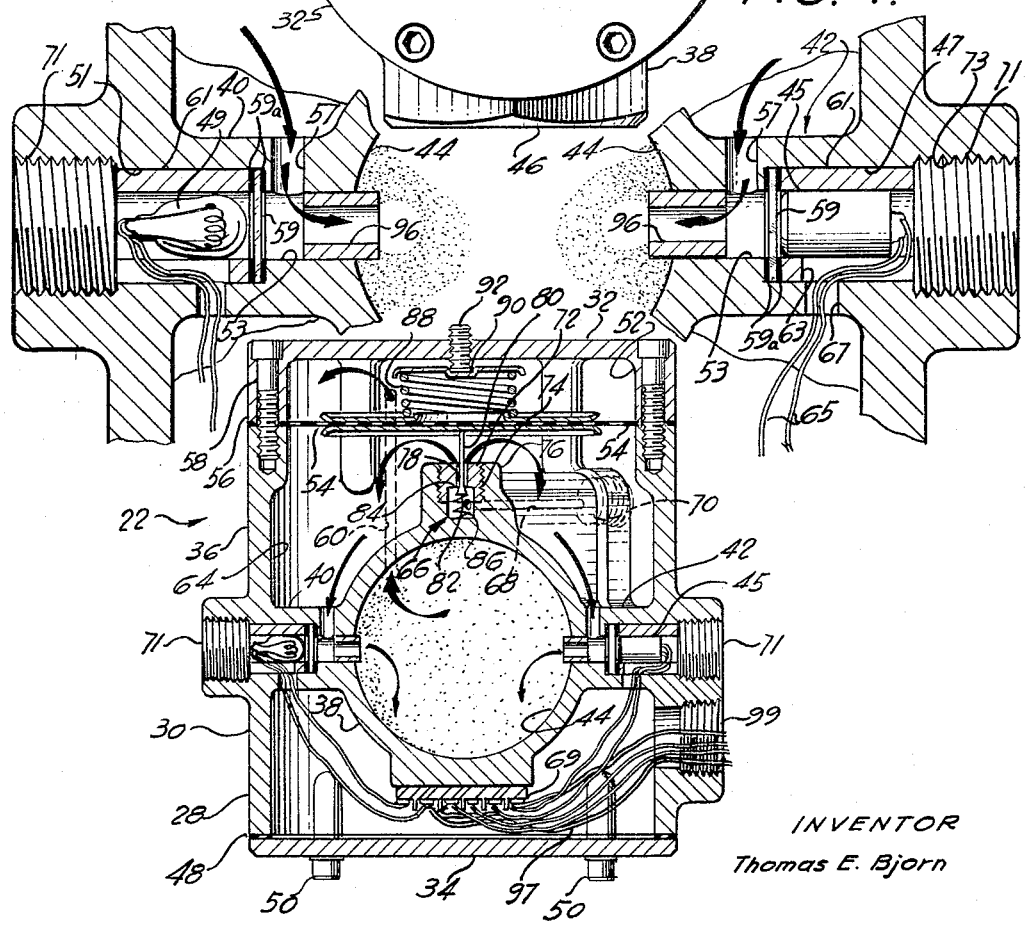

United States Patent Office 3,268,734
Patented August 23, 1966

3,268,734
OIL MIST FLUID MONITOR
Thomas E. Bjorn, Northbrook, Ill., assignor to Stewart-Warner Corporation, Chicago, Ill., a corporation of Virginia
Filed Sept. 30, 1963, Ser. No. 312,579
7 Claims. (Cl. 250—218)

This invention relates to monitors for fluid carrying systems and more particularly to apparatus for monitoring fluids having substantial densities to the passage of light and having properties leading to the contamination of monitoring apparatus.

For example, the apparatus of this invention is particularly useful with an oil mist lubrication system to monitor the delivery of oil in aerosol form in lubricant distribution lines. It is to be understood that although the monitor is ideally suited for oil mist and is described in this application with reference to such a system that it may be applicable to other types of fluid handling systems in which the detection of optically dense and contaminating fluids is desired. However, because of the particular suitability the invention will be disclosed with reference to an oil mist lubrication system.

Briefly, oil mist systems operate to lubricate bearings and the like by admixing high velocity air and liquid oil to generate an aerosol of very fine oil particles. The heavier particles are caused to condense by appropriate baffle means and the resulting aerosol or oil mist is transported through conduits to the desired bearing locations. The mist may be transformed into a more usable state by means of appropriate fittings adjacent the bearings. For example, the mist may be condensed into droplets or into a spray whichever may be appropriate for the particular bearing.

The oil mist type of lubrication provides an automatic lubricating means which can operate unattended and continuously for long periods of time. Since these systems may be used to lubricate expensive machinery and the like, it is most desirable that means be provided to monitor the proper operation of the system. The apparatus of the present invention accomplishes this purpose by monitoring the presence of mist flowing in the conduit lines from the output of the oil mist generator unit.

The monitoring of oil mists causes special problems because of the contaminating or tacky nature of oil mist which makes them difficult to measure accurately. Most, if not all, present day monitoring devices which use photoelectric means to detect optically dense fluids are inadequate in this application because the oil mist condenses on the optical and photoelectric means. An accurate view of the mist in the system is, therefore, not presented to the photoelectric means and the device is virtually unusable for these applications.

It is, therefore, an object of this invention to provide a fluid monitoring system.

It is another object of this invention to provide a fluid monitoring system for optically dense fluids which will operate properly despite the contaminating nature of the fluid.

It is a further object of this invention to provide a specially designed unit for use in a fluid monitoring system of the type herein described.

Other objects and advantages of the present invention will be readily recognized upon a further reading of the specification especially when taken in view of the accompanying drawings, in which:

FIG. 2 is an elevation view, in section, of an oil mist monitoring unit;

FIG. 3 is a plan view partially broken away of the oil mist monitoring unit;

FIG. 4 is an enlarged partial view, in section, of the monitor unit showing the photocell mounting means;

FIG. 5 is an enlarged partial view of the oil mist meter unit showing the mounting means for the lamp.

Briefly, a monitoring apparatus embodying the teachings of this invention comprises a housing with means defining a through-passage for air laden with the contaminating material. Photocell and light means are optically arranged across at least a portion of the passage for producing an electric signal responsive to the density of the contaminating material in the air. Means including ducts in said housing are provided for maintaining a blanket of clean air immediately adjacent the photocell and light means to keep them free of contaminating material. Visual and/or audible warning means energizable by the electric signal indicate the desired condition.

Figure 1:
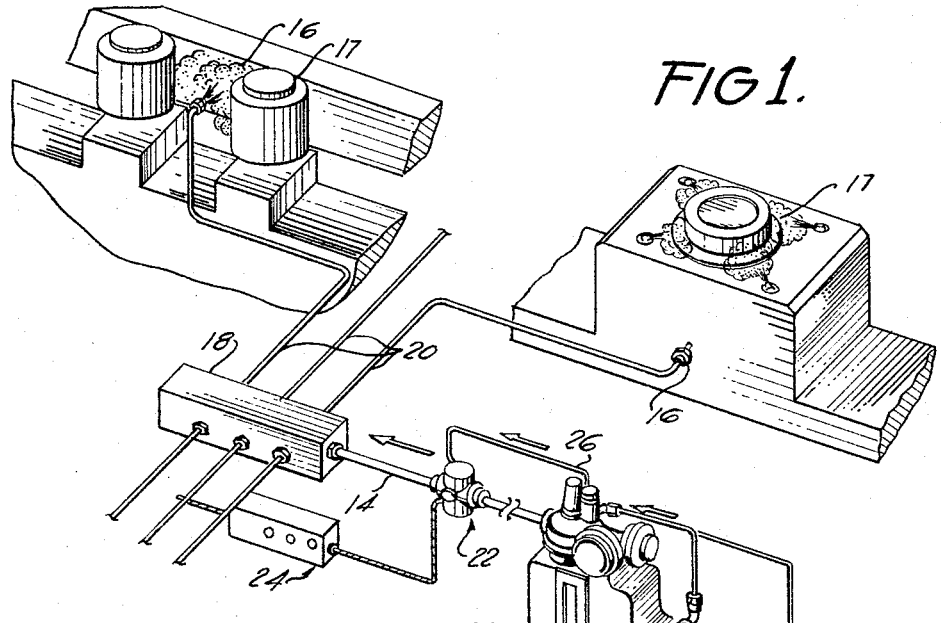
FIG. 1 is an isometric view of an oil mist system including monitoring apparatus as taught by this invention.

Referring now to FIG. 1 an oil mist system comprises a mist generator and reservoir unit 10 of any well known type in which air from source 12 is admixed with liquid oil from the mist generator and reservoir unit 10 so as to produce an aerosol of minute oil particles suspended in air. The aerosol is carried at low velocity under slightly superatmospheric pressure through conduit means 14 to the desired location. There may be several fittings 16 at the desired location to lubricate one or more bearings 17 on one or more pieces of machinery. If such is the case the conduit means 14 may terminate in a manifold 18 with feeder lines 20 branching out to the individual fittings 16. The fittings 16 may cause the application of oil mist, oil spray or condensed droplets to the bearings in a manner described in U.S. Patent No. 2,959,249, issued November 8, 1960, to K. E. A. Gothberg, et al.

The monitor system includes a monitor unit 22 which may be located adjacent the inlet to the manifold 18. Of course more than one unit may be used if it is desired to monitor the mist going through any individual bearings 16. For best operation, of course, the monitor unit 22 should be located close to the lubricant fittings 16 rather than near the output of the mist generator and reservoir unit. In this manner, the supply of oil mist to the fittings is properly monitored rather than its output of the generator. Thus any blocks in the conduits are also indicated by the device.

Coupled with the monitor unit is an alarm circuit unit 24 to provide audible and/or visible indications of the presence or absence of oil mist in the monitor unit. Clean air from source 22 is delivered to the monitor unit 22 by conduit 26 for reasons which will be more readily understood with reference to the detailed description of the monitor unit.

The monitor unit 22, as shown in FIGS. 2 through 5, comprises a housing 28 formed of a cast body member 30 and a pair of cap members 32 and 34, respectively. The body 30 has a substantially circular outer wall 36 and a tubular portion 38 extending therethrough formed integral therewith by virtue of the webbing portions 40 and 42 extending between the wall 36 and the tubular portion 38. The interior 44 of tubular portion 38 forms a passage for the oil mist and is threaded at 46 at either end for junction with the oil mist system conduits 14. The cap member 34 enclosing the bottom end of the body 36 is sealingly attached thereto by gasket 48 and bolts 50.

A photoelectric means 45, such as a photoresistive-type photocell is positioned in a recess 47 within web 42 so as to optically view the passage 44 as may best be seen in the enlarged segment of FIG. 4. A lamp 49 (FIG. 5) resides in a recess 51 within the other webbing 40 positioned diametrically opposite and in alignment with the photocell 45 to be optically viewable thereby. Since oil mist carried by the air through passage 44 has an optical density substantially greater than air, its presence in the air stream will cause variations in the amount of light received by the photocell 45 from the lamp 49.

The oil mist is a contaminating type of fluid having a tacky nature which would cause it to deposit on the surfaces of the photocell and lamp 49 to cause inaccurate indications of the amount of mist flowing through passage 44. Therefore, precautions have been made to prevent the deposit of oil on the surfaces of the photoelectric and illuminating elements 45 and 49 respectively by the following construction.

The recess 47 is formed by a bore 53 and counterbore 55 extending from outside the housing 30 through web 42 to passage 44. A shoulder 57 is formed therein against which a lens 59 and gaskets 59a are held by a sleeve 61 surrounding the photocell 45. The sleeve 61 is slotted at 63 to provide access for the photocell electric leads 65 through aperture 67 to a terminal board 69 (FIG. 2). A sealing plug 71 in a threaded counterbore 73 holds the photocell 45, sleeve 61, gaskets 59a and lens 59 in tight assembly against the shoulder 57. The lamp 49 is supported in assembly with its own lens 59, gaskets 59a and sleeve 61 in identically the same manner as the photocell 45 by a sealing plug 71. Hence the detailed description of the assembly will not be included.

The photocell and lamp are both recessed from the oil mist carrying passage 44 in order that they may be protected from contamination from the oil. Duct means 94 extend between the fresh air chamber 64 and the recesses 53 between the lenses 59 and the passage 44 for flowing air from the air chamber 64 past the lens into the passage 44. Sleeves 96 are positioned at the open terminal ends of the recesses 53 to provide pressure drops for air flowing from the chamber 64.

Referring again to the housing the top cap member 32 is cup-shaped to define a chamber 52 with a diaphragm 54 captured between the flange 56 of cap 32 and the circular top of body 36. The diaphragm 54 also provides a seal for the cap 32 and the cap is fastened to the outer wall 36 by bolts 58. The chamber 52 defined by the diaphragm 54 and the upper cover 32 is in communication with the passage 44 by means of a duct 60 formed by aligned bores in the wall 36 and the flange 56 of the cap 32. Thus, the chamber 52 is subjected to the oil mist pressure of the passage 44.

A second chamber 64 is formed by the diaphragm 54 interior of circular walls 36, lower cover 34 and the exterior surface of tubular portion 38. This chamber 64 is connectable to a fresh air supply by means of a valve assembly 66 and a duct 68 bored through cast structure 70 provided particularly for that function. The valve assembly 66 comprises a plug 72 threaded into a recess 74 formed within a protruding structure 76 on the tubular portion 38. Plug 72 has a passage 78 to which valve stem 80 extends to abut the diaphragm 54 at its one end. The other end of the stem 80 carries the valve member 82 which cooperates with the valve seat 84 to control the passage of clean air from duct 68 through passage 78 to chamber 64. A spring 86 maintains the valve 82 in engagement with the valve seat 84 and/or the upper end of the stem 80 in contact with the diaphragm 54.

A spring 88 extending between the top of diaphragm 54 and an adjusting mechanism 90 including screw 92 extending through cover 32 permits regulation of the pressure differential between chambers 52 and 64 so that proper scrubbing takes place as hereinbefore described.

As hereinbefore discussed provisions are made for flowing clean air from the chamber 64 through ducts 57 past the lenses 59 protecting the photocell 45 and lamp 49, through the sleeves 96 to the oil mist carrying passage 44. This flow of air provides a scrubbing action for maintaining the lens 59 clean and free from contaminating oil. The purpose of the diaphragm 54 and the valve arrangement 66 is to maintain the proper pressure differential between the passage 44 and the chamber 64 to maintain the correct direction of air flow. That is, clean air must flow from the clean air chamber 64 past the lenses 59 to the oil mist passage 44. A pressure differential in the opposite direction would cause flow of mist laden air from the passage 44 past the lenses to chamber 64 which would cause severe contamination of the lens.

It has been found that the device operates properly when the pressure differential between the chamber 64 is maintained at about 2 inches of water. It is, of course, important that the pressure differential not be too great, for the clean air entering the passage 44 through the recesses 53 will tend to dilute the oil mist and disturb the lubricating function.

The proper pressure differential is maintained by the diaphragm 54 and valve assembly 66. One side of the diaphragm is subjected directly to the clean air pressure of chamber 64 and the other side is subjected to the pressure of the mist laden air in passage 44 by means of passage 60 interconnecting passage 44 and chamber 52. The spring with the diaphragm arrangement will operate to regulate the pressure of the air in chamber 64 with respect to the pressure of the oil mist laden air in the passage 44 regardless of the absolute pressures in the system. This, of course, is extremely important to prevent the backward flow of oil mist laden air through the recesses so as to contaminate the lenses 59 and impair the optical path between the lamp 49 and the photocell 45.

The photocell and lamp are electrically connected to the alarm circuits 24 by cable means 97 extending from the terminal block 69 through a sealing plug 99 provided in the wall 36 of the body portion.

Figure 6:
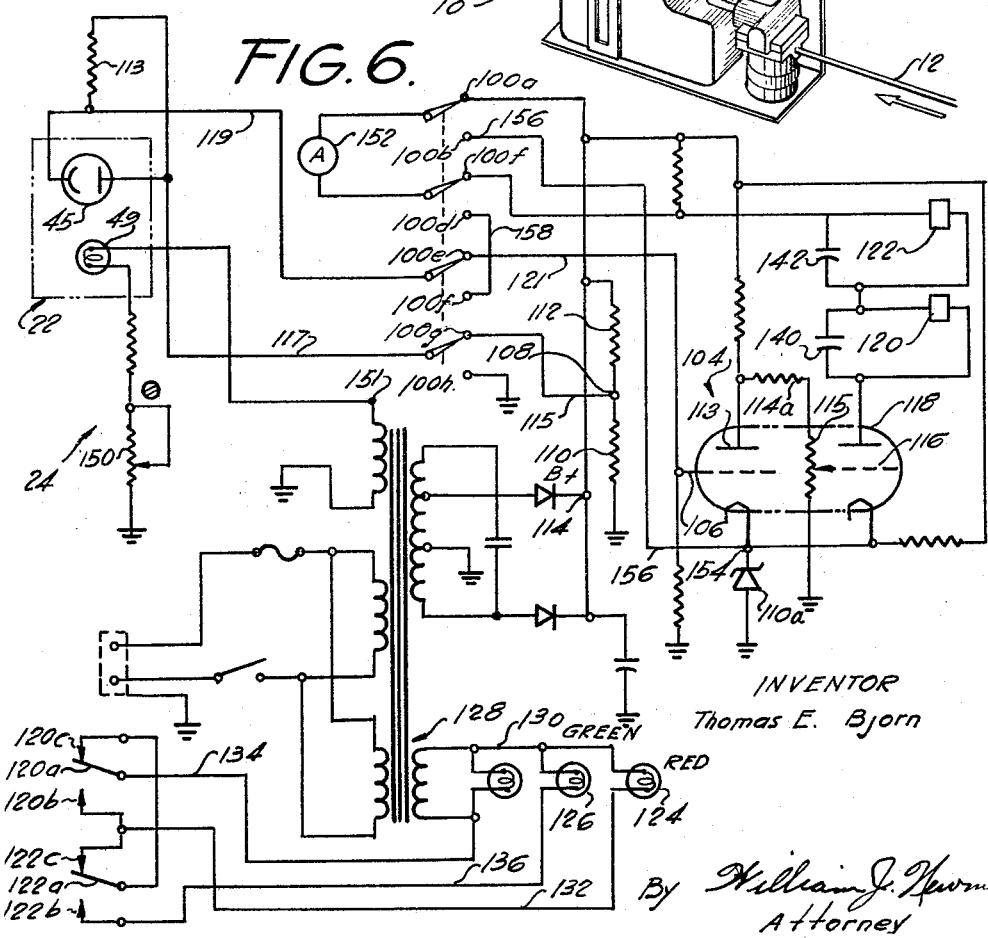
FIG. 6 is a schematic diagram of the alarm circuit.

Reference is now made to the schematic diagram of FIG. 6 showing one type of alarm circuit which may be used with the monitor hereinbefore described. The particular circuit shown is described and claimed in the copending application, Serial No. 312,767, of Norman H. Kadivnik, filed on even date herewith and owned by the assignee of the present application.

The photoresistive type photocell 45 in the monitor unit 22 is connected through contact 100e of a ganged selector switch 100 to the input of a triode amplifier 104 in the alarm circuits unit 24. When the selector switch 100 is in the operate position, as shown in FIG. 6, the photocell is series connected between the grid 106 and junction 108 in the voltage divider comprising resistors 110 and 112 between ground and the power supply B+ terminal 114. This circuit may be traced from ground, resistor 110, junction 108, conductor 115, contacts 100g of selector switch 100, conductor 117, photocell 45, conductor 119, contacts 100e and conductor 121 to grid 106. Resistor 113 across the photocell 45 serves to decrease its sensitivity somewhat to prevent spurious operation by minute changes of light. The resistors 110 and 112 are selected so that the operating point of amplifier 104 is on the linear part of its operating characteristic. The input bias of the amplifier 104 is stabilized by means of a zener diode 110a in the cathode circuit of the amplifier connected through resistor 111 to the B+ voltage at terminal 114.

The output from plate 113 of amplifier 104 is fed through resistor 114 and potentiometer 115 to the grid 116 of the second triode amplifier 118. A pair of relays 120 and 122 are series connected in the plate circuit of amplifier 118 and are set to operate at different levels of plate current through the amplifier 118. That is, one of the relays, 122 for example, is set to operate and pull in armature 122a at a current level which represents a normal operating condition, whereas the other relay, 120, is set to pull in its armature 120a at a current level signifying a malfunction in the system.

Each of the relays 120 and 122 have a set of make contacts 120b, 122b and a set of break contacts 120c, 122c, respectively. These contacts are connected through appropriate circuitry to energize the red and green warning lights 124 and 126 in the following manner. When there is insufficient current passing through the plate circuit of amplifier 118 to energize either of the relays 120 or 122 the contacts assume the position as shown in FIGURE 6 to connect the red light 124 to electric power through the circuit including conductor 130, red light 124, conductor 132, break contacts 122c, armature 122a, break contact 120c, armature 120a and conductor 134 to the secondary of a power transformer 128. The normal operating condition is signified by the passage of sufficient plate current through amplifier 118 so that relay 122 is pulled in and relay 120 is not pulled in. In this condition the red light 124 is disconnected and green light 126 is connected across the transformer 128 through the circuit comprising conductor 130, green light 126, conductor 136, make contact 122b, armature 122a, break contact 120c, armature 120a and conductor 134.

If the plate current through amplifier 118 is sufficiently high to pull in both relays 120 and 122, the green light 126 is disconnected and the red light 124 is connected across the power transformer 128 through the circuit including conductor 120, red light 124, conductor 132, make contacts 120b, armature 120a and conductor 124.

The circuitry as hereinbefore described operates in conjunction with the oil mist monitor unit to monitor the flow of oil mist to the supply conduits in the following manner. When the oil mist is at the desired flow rate, the light received at the photocell is such to cause the amplifiers to maintain only relay 120 pulled in. The plate current from amplifier 118 is insufficient to pull in relay 122 so that the red warning light is deenergized and the green light 126 is energized through the circuit hereinbefore disclosed.

When no mist is flowing through the passage 44 in the monitor unit 22 between the lamp 49 and the photocell 45 the light quantity received is maximum causing the photocell resistance to be minimum. Thus the grid 106 of amplifier 104 is more positive and the grid of amplifier 118 is more negative. The plate current of amplifier 118 is reduced so that neither relay 120 or 122 is operated and the red lamp 124 is energized by the circuit hereinbefore described.

When an overabundance of oil mist is present in the passage 44 of the monitor unit 22 the photocell 45 receives a minimum quantity of light and hence its resistance is maximum. This increases the bias to the amplifier 104 reducing its plate current and hence causes the grid 116 of amplifier 118 to be substantially more positive. Both relays 120 and 122 are pulled in by the higher plate current so that the red warning light 124 is again energized through the circuit hereinbefore described.

Oil mist systems often operate to cause an unsteady flow of oil mist through its supply conduits. Puffs of dense mist as well as intermittent periods of less dense flow are often experienced in these systems. Therefore capacitors 140 and 142 are provided in parallel with each respective relay 120 and 122 to increase the operating time constants.

It is desirable that the monitor apparatus be applicable to monitor the flow of oil mist regardless of the type of lubricant used. It should be operable with oils having different colors or different densities or simple means should be provided for adjusting it to operate properly. A calibration means is required and this is provided by the potentiometer 150 in the obvious circuit between ground and power supply terminal 151 for energizing lamp 49 in the monitor unit 22. In addition the multibank switch 100 has a calibrate position to connect the photocell 45 in a calibrating circuit so that the lamp intensity may be adjusted in accordance with the particular lubricant being used. When the switch 100 is in the calibrate position the photocell is in series connection with an ammeter 152 across the regulated voltage source provided at the zener diode 109. This circuit extends from the zener diode 109 through junction 154, conductor 156, contact 100b of switch 100, meter 152, contact 100d, conductor 158, contact 100f, photocell 45 and contact 100g to ground.

To calibrate the system for operation with a particular lubricant the switch 100 is turned to the calibrate position and the oil mist system is operated for a sufficient length of time to stabilize itself. When the flow rate of the oil mist through the supply conduits is at a desired level, the potentiometer 150 in the lamp energizing circuit is manipulated until the light level is such to cause the meter 152 to read a certain current value. The circuit parameters in the amplifiers are chosen so that light level will cause a plate current through amplifier 118 midway between the pull-in values of relays 120 and 122, respectively. Thus deviations of the light received by the photocell due to an excess or absence of oil mist in the air will cause the relays 120 and 122 to operate to signify such condition. Switch 100 is then moved to its operate position and the apparatus is set to perform its monitoring function.

The fail safe nature of the monitoring circuits can be readily seen. Any malfunction which causes an abnormally large or small plate current through amplifier 118 will cause the red warning light 124 to be energized. In addition, any circuit discontinuity or malfunction of the lamp in the monitor unit 22 will cause a red indication in the amplifier circuitry. It is to be noted that the circuit may be made completely fail safe by causing the insertion of a separate power supply, perhaps a battery across the secondary 128 by normally open relay contacts (not shown) whenever there is a commercial line failure to the power supply.

While there has been described one embodiment of the metering apparatus embodying the teachings of this invention, it is recognized that many modifications may be made thereto without departing from the spirit of the invention. Therefore, it is intended that the invention be limited only by the scope of the appended claims.

What is claimed is:

1. A unit for monitoring the presence of a dense and contaminating material carried by an air medium, comprising a housing, means in said housing defining a through-passage for carrying the material laden air, photocell and light means in optical cooperation with one another for producing an electric signal responsive to the density of said contaminating material in the air, means including ducts in said housing for maintaining a blanket of clean air immediately adjacent the said photocell and light means, and means for sensing the pressure of said material laden air and for maintaining a substantially constant pressure difference between said clean air and said material laden air.

2. A monitor unit for use in a conduit line with an oil mist system comprising a housing, means in said housing defining a first and second chamber, means for conducting oil mist from said conduit line into and out of said first chamber, means for subjecting said second chamber to clean air at a pressure at least slightly above the pressure of the mist in said first chamber, photoelectric and light element means in optical cooperation across at least a part of said first chamber, duct means between said chamber and adjacent to said photoelectric and light means for keeping same free of lubricant, and means operative responsive to pressure differential between said chambers for regulating the pressure in said second chamber to maintain a substantially constant pressure excess of the air in said second chamber over the mist in said first chamber.

3. Apparatus for monitoring the presence of oil mist passing through a conduit line comprising a housing, a tubular element extending through said housing adapted to be inserted into said line for passing oil mist, a clean air supply, means for connecting said air supply to the interior of said housing, a pair of opposed and aligned recesses each communicating at its open end with the interior of said tubular element, a photoelectric element embedded in one of said recesses remotely of the open end, an illuminating element embedded in the other recess remotely of its open end, a lens sealingly isolating each element from the open end of the respective recess, duct means connecting the interior of said housing to each of said recesses at a point adjacent said lens, and means separate from said recesses and inserted in a respective recess for constricting each recess at its open end.

4. A device to be used for monitoring the presence of oil mist passing through a conduit line comprising a housing, a tubular element integral with and extending through said housing adapted to be inserted into said line for passing oil mist, a diaphragm across the interior of said housing to define two chambers, duct means connecting one of said chambers to the interior of said tubular element, a clean air supply, means including a valve operable by said diaphragm for connecting said air supply to the other of said chambers, a pair of opposed and aligned recesses each communicating at its open end with the interior of said tubular element, a photoelectric element embedded in one of said recesses remotely of the open end, an illuminating element embedded in the other recess remotely of its open end, a lens sealingly isolating each element from the open end of the respective recess, duct means connecting said other chamber to each of said recesses at a point adjacent said lens, and means separate from said recesses and inserted in a respective recess for constricting each recess at its open end.

5. An apparatus for monitoring the presence of oil mist passing through a conduit line comprising a housing insertable into said conduit line, means in said housing defining a through-passage for said mist and a separate chamber, means providing clean air to said chamber under pressure at least slightly greater than the pressure of the oil mist in said passage, photoelectric and light means supported by said passage defining means in optical cooperation with one another to sense changes in density with oil mist in said passage, dust means between said chamber and said passage for passing clean air about said photoelectric and light means to prevent deposit of oil from said mist thereon, means including a diaphragm and valve operative responsive to the pressure differential between said passage and said chamber for regulating the air pressure in said chamber, and means operative responsive to the output signal of said photocell means for indicating presence and absence of oil mist in the passage.

6. Apparatus for use with an oil mist detector of the type including a photocell spaced from a light source arranged to transmit light to said photocell through an air stream carrying oil mist for monitoring the density of said oil mist, the improvement comprising means for interposing oil free air between said air stream and said photocell and between said air stream and source, and means for maintaining a substantially constant pressure difference between said interposed air and said air stream to avoid the introduction of excessive interposed air into said air stream irrespective of pressure variations occurring in said air stream.

7. Apparatus as claimed in claim 6 in which said means for maintaining a substantially constant pressure difference comprises a valve controlling the flow of said interposed air, a diaphragm for controlling said valve, means for exposing one side of said diaphragm to said air stream, and means for exposing the opposite side of said diaphragm to said oil free air for controlling said diaphragm and valve to maintain a substantially constant pressure difference between said oil free air and said air stream.

References Cited by the Examiner

UNITED STATES PATENTS

| 1,978,589 | 10/1934 | McFarlane | 250—238 X |
| 2,935,909 | 5/1960 | Mathisen | 88—14 |
| 3,030,192 | 4/1962 | Schneider | 250—218 X |
| 3,207,026 | 9/1965 | Churchill et al. | 250—218 X |

RALPH G. NILSON, *Primary Examiner.*

WALTER STOLWEIN, *Examiner.*